United States Patent
Laurent et al.

(10) Patent No.: US 7,015,672 B2
(45) Date of Patent: Mar. 21, 2006

(54) METHOD FOR CONTROLLING A VARIABLE-RELUCTANCE MACHINE

(75) Inventors: Jean-Marie Laurent, Osny (FR); Stéphane Sorel, Eragny sur Oise (FR); Nicolas Guillarme, Meriel (FR); Bruno Wevers, Bloomfield Hills, MI (US)

(73) Assignee: Johnson Controls Automotive Electronics, Osny (FR)

(*) Notice: Subject to any disclaimer, the term of this patent is extended or adjusted under 35 U.S.C. 154(b) by 0 days.

(21) Appl. No.: 10/484,678

(22) PCT Filed: Jul. 18, 2002

(86) PCT No.: PCT/FR02/02565

§ 371 (c)(1),
(2), (4) Date: Jan. 23, 2004

(87) PCT Pub. No.: WO03/012973

PCT Pub. Date: Feb. 13, 2003

(65) Prior Publication Data

US 2004/0239284 A1   Dec. 2, 2004

(30) Foreign Application Priority Data

Jul. 30, 2001  (FR) .................................. 01 10186

(51) Int. Cl.
H02P 7/05 (2006.01)

(52) U.S. Cl. ....................... 318/701; 318/254; 318/377

(58) Field of Classification Search ................. 318/254, 318/701, 376–378
See application file for complete search history.

(56) References Cited

U.S. PATENT DOCUMENTS

| | | | | |
|---|---|---|---|---|
| 4,348,619 A | * | 9/1982 | Ray et al. | 318/139 |
| 4,496,886 A | * | 1/1985 | Gordon et al. | 318/254 |
| 4,698,562 A | * | 10/1987 | Gale et al. | 318/254 |
| 6,137,256 A | * | 10/2000 | Morris | 318/701 |

FOREIGN PATENT DOCUMENTS

| | | |
|---|---|---|
| DE | 43 14 290 A1 | 11/1994 |
| EP | 0 526 660 B1 | 2/1993 |
| EP | 0 692 862 B1 | 1/1996 |
| GB | 2 274 361 A | 7/1994 |

OTHER PUBLICATIONS

Krishnan R et al., "Analysis and Design of a Single Switch per Phase Converter for Switched Reluctance Motor Drives," Proceedings of the Annual Power Electronics Specialists Conference, Taipei, Taiwan, Jun. 20-24, 1994, New York, IEEE, US. vol. 1 Conf. 25 Jun. 20, 1994, pp. 485-492, XP000492053, ISBN: 0-703-1860-9.

* cited by examiner

Primary Examiner—Bentsu Ro
(74) Attorney, Agent, or Firm—Foley & Lardner LLP

(57) ABSTRACT

A method of controlling a machine including at least one inductive coil (n), the inductive coil being connected to a primary electricity power supply network (RP) via a control circuit comprising, between a connection point (A) of the coil (n) in question and terminals of the primary network (RP), at least one half-bridge of a variator adapted to controlling said machine, the half-bridge being formed by first and second controlled switches (T+n, T−n). In the method, connection point (A) of said coil (n) is connected to at least one third controlled switch (Tn-x), the third switch (Tn-x) constituting a bypass switch connected to at least one secondary electricity power supply network (Rx), and the electrical state of the third switch (Tn-x) is associated with that of the half-bridge.

25 Claims, 4 Drawing Sheets

METHOD FOR CONTROLLING A VARIABLE-RELUCTANCE MACHINE

The present invention relates to a method of controlling a polyphase electrical machine having coils with inductance that can be put to good use. This is possible for coils having an electrical time constant that is greater than the chopping period generated by the control method.

More particularly, the invention relates to a method of controlling a variable-reluctance electrical machine enabling use to be made of the energy stored in the inductive coils of electrical machine, with this being as a function of the various operating states of the machine.

Thus, starting from a variable-reluctance electrical machine, the control method must enable some or all of the following functions to be performed:
  performing a starting function with the electrical machine being powered from a primary power supply network constituted, for example, by a battery;
  performing a generator function on the primary network;
  performing a generator function on at least one secondary network, e.g. constituted by a battery;
  performing a power supply function for at least one secondary network from the primary network;
  performing a function of charging or recharging at least one storage battery from at least one secondary network; and
  performing a primary power supply function from at least one secondary network.

BACKGROUND

Variable reluctance machines are known in particular that comprise at least one inductive coil, the inductive coil being connected to a primary electricity power supply network via a control device which comprises, between a connection point of the coil under consideration and terminals of the primary network, at least one half-bridge of a variator adapted to control said machine, said half-bridge being formed by first and second controlled switches, each of the first and second switches being capable of occupying an ON state or an OFF state.

Such machines give full satisfaction from a technical point of view, but their method of control does not enable use to be made of the electrical energy stored in the coils.

SUMMARY

A particular object of the present invention is to mitigate that drawback.

To this end, a method of controlling a machine of the kind in question comprises the steps of:
  connecting the connection point of said coil to at least one third controlled switch capable of occupying an electrical OFF state or an electrical ON state, said third switch constituting a bypass switch connected to at least one secondary electrical power supply network; and
  associating the electrical state of the third switch with that of the half-bridge in such a manner that the electrical energy stored in the inductive coil of the machine is retransmitted to the main network and/or to the secondary network.

By means of these dispositions, the inductive coils of the variable-reluctance machine are used as a corresponding number of energy storage elements (current sources) enabling energy to be exchanged between the various networks or between the machine and the various networks.

In preferred implementations of the invention, recourse may optionally be had also to one or more of the following dispositions:
  the third switch is turned ON only when the first and second switches are OFF;
  the third switch connected to a first secondary network is turned ON only when another third switch connected to a second secondary network is OFF; and
  a dead time is introduced between the times the third switches are ON so as to avoid short circuits between the primary network and the secondary electrical power supply networks.

In another aspect, the invention consists in using the control method to implement a static converter for multiplying or dividing voltage, or a combined variator and converter.

In yet another aspect, the invention consists in using the same control method on a two-voltage variable-reluctance alternator/starter.

BRIEF DESCRIPTION OF THE DRAWINGS

Other characteristics and advantages of the invention appear from the following description of an implementation thereof given by way of non-limiting example and with reference to the accompanying drawings.

In the drawings.

MORE DETAILED DESCRIPTION

In the various figures, the same references designate elements that are identical or similar.

Figure 1:
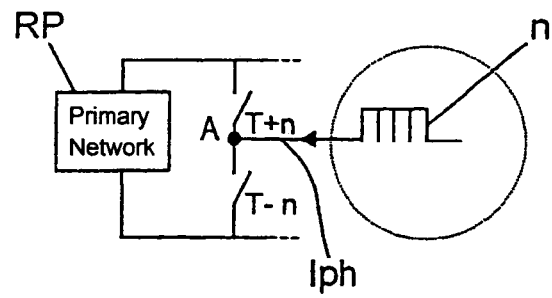
FIG. 1 is a diagrammatic view of a half-bridge for controlling a variable-reluctance machine.

In FIG. 1, there can be seen the conventional structure of a variator half-bridge dedicated to controlling a variable-reluctance machine. To simplify the description, only one of the inductive coils of the machine is shown in FIG. 1, and this coil is referenced n.

Current Iph from this inductive coil is fed via a connection point A of the coil to the midpoint A of a half-bridge belonging to a control variator of said machine, the half-bridge being constituted by first and second controlled switches T+n and T−n connected in parallel between the connection point of said coil and a primary electricity power supply network RP. This electricity power supply network provides a direct current (DC) voltage, in particular of the 0–42 volts (V) or the 0–12 V type.

For a polyphase machine, the inductive connection between the machine and the half-bridges of the variator can be provided either in independent manner, in which case no coupling is provided between phases, or else in dependent manner, in which case coupling between the phases and the half-bridges takes place via a delta or a star connection.

Figure 2:
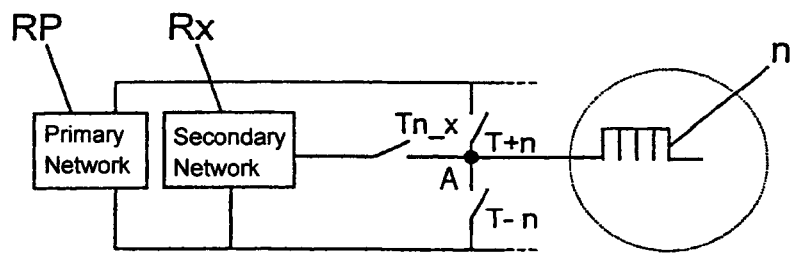
FIG. 2 is a diagrammatic view of a half-bridge for controlling a variable-reluctance machine in accordance with the invention.

FIG. 2 shows a variator structure that is derived from FIG. 1, in which the teaching of the invention appears. Specifically, at least one variator half-bridge is associated with at least one third controlled switch Tn-x, this switch connecting the connection point A of at least one coil to at least one secondary electricity power supply network Rx.

In order to avoid short circuits between the various electricity power supply networks, it is necessary for the first and second switches T+n and T−n to be turned ON in a manner that is exclusive relative to the way in which the third switch Tn-x is turned ON, and to do this, dead times are introduced in the control cycles of these switches.

Figure 7:
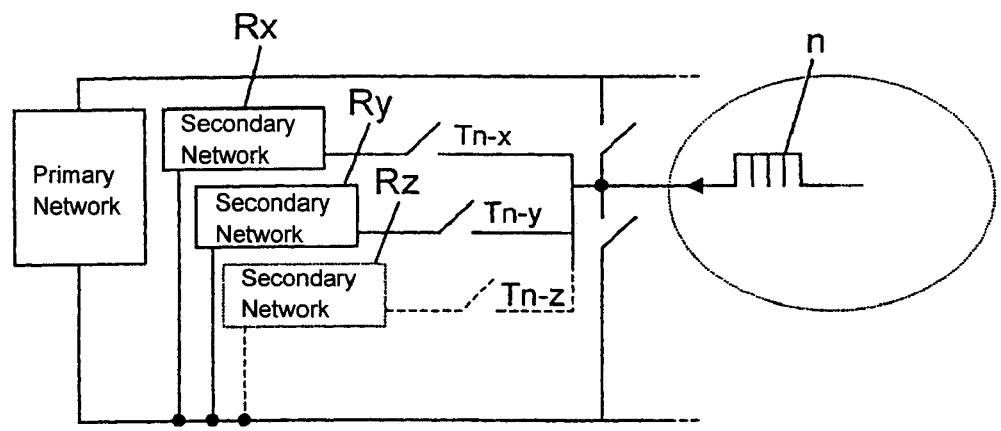
FIG. 7 is a diagrammatic view of a variable-reluctance machine comprising a plurality of secondary electrical power supply networks.

Care is also taken to ensure that the third switches Tn-x, Tn-y, Tn-z are also turned ON in a manner that is completely exclusive relative to one another (as can be seen in FIG. 7), these switches possibly being connected to respective secondary networks Rx, Ry, Rz.

Figure 3:
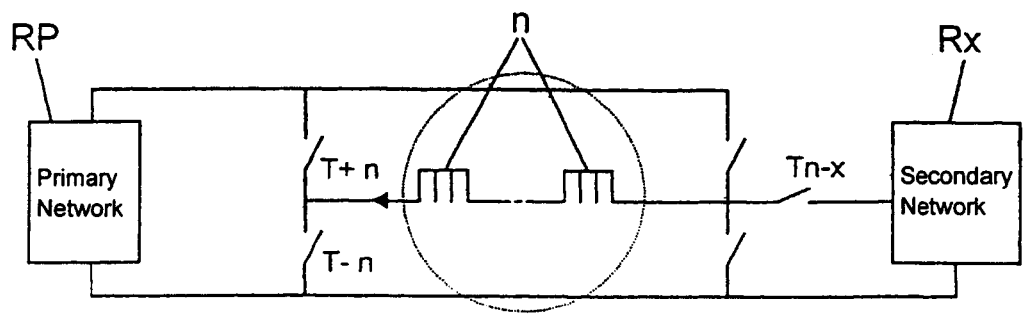
FIG. 3 is a diagrammatic view of a variable-reluctance machine operating as a voltage multiplier.

FIG. 3 shows use of the variable-reluctance machine shown in FIG. 2 as a static voltage converter between the primary power supply network RP and a secondary network Rx. In this example, the variable-reluctance machine is stopped (it is not rotating).

In FIG. 3, the control method enables it to be operated as a voltage multiplier, i.e. it enables the primary network to be recharged from a secondary network Rx of lower voltage.

Figure 3A:
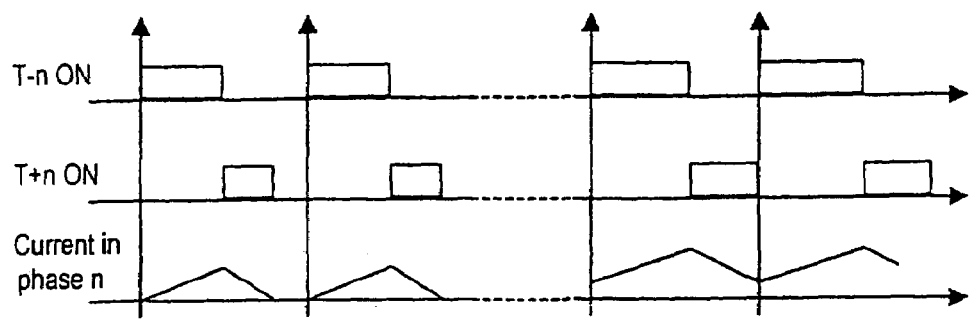
FIG. 3a is the timing diagram for controlling the switches of the FIG. 3 machine.

In this DC mode of operation, the third switch Tn-x remains ON. The power transmitted to the primary electricity supply network is regulated by the ratio of the magnetization times of the coil (T−n ON) and the demagnetization times of the same coil (T+n ON), as is shown in FIG. 3a.

Figure 4:
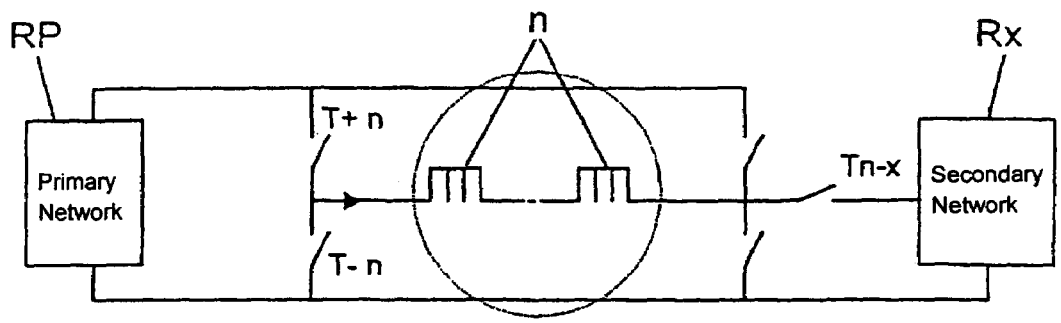
FIG. 4 is a diagrammatic view of a variable-reluctance machine operating as a voltage divider.

The variable-reluctance shown in FIG. 4 is identical to that shown in FIG. 3, but it operates differently. The current delivered from the coil connection point flows in the opposite direction to that shown in FIG. 3. In this configuration, the machine continues to act as a static converter between the primary network RP and at least one secondary network Rx, but it operates in voltage divider mode (recharging at least one secondary network from the higher-voltage primary network).

Figure 4A:
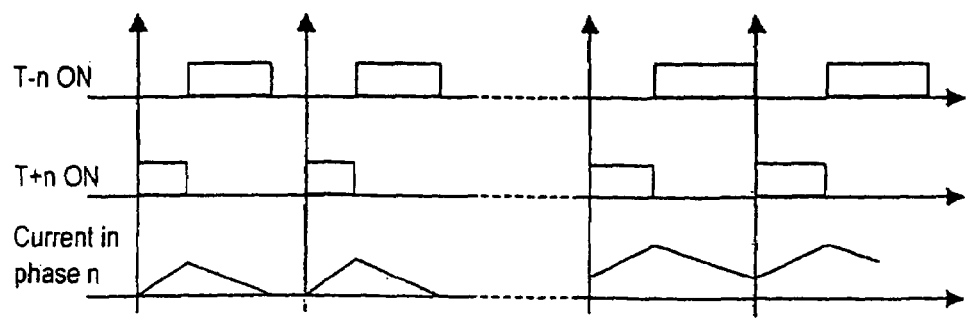
FIG. 4a is the timing diagram for controlling the switches of the FIG. 4 machine.

In this DC mode of operation, the third controlled switch Tn-x remains ON and power between the primary network RP and the secondary network Rx is regulated by the ratio of the magnetization times of the inductor (T−n ON) and its demagnetization times (T+n ON), as shown in FIG. 4a.

Figure 5:
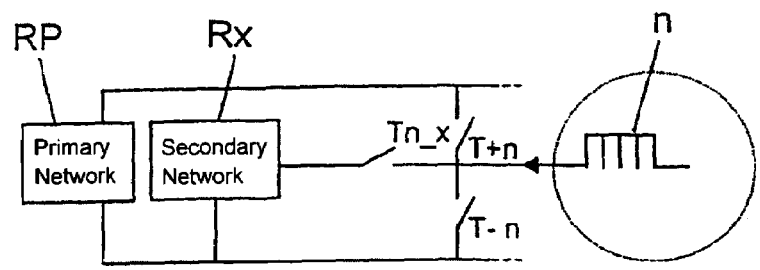
FIG. 5 is a diagrammatic view of a variable-reluctance machine acting as a voltage converter.

FIG. 5 shows the use of the variable-reluctance machine shown in FIG. 2 as a converter and a variator between the primary power supply network RP and a secondary power supply network Rx. In this example, the variable-reluctance machine is in operation (it is rotating).

Figures 5A, 5B:
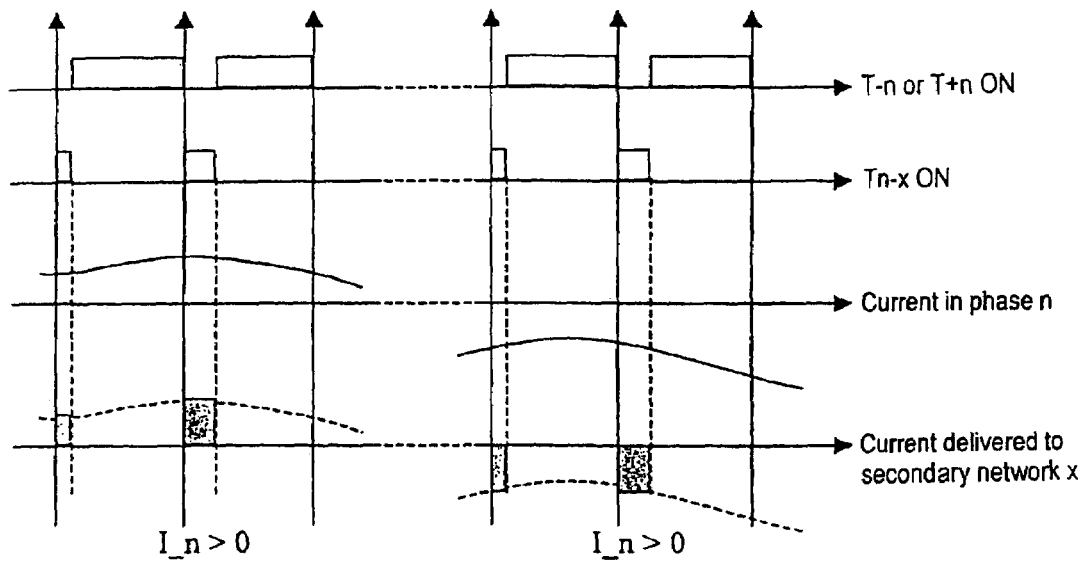
FIGS. 5a and 5b are the timing diagrams for controlling the switches of the FIG. 5 machine respectively when recharging the secondary network and when discharging the secondary network.

Depending on electrical requirements, the secondary network Rx is charged or discharged by taking current from at lest one coil. It should be observed that the method is adapted to taking current, with this applying regardless of its flow direction. The magnitude of the charging or discharging current is adapted as a function of the ON time of the third switch Tn-x, as shown in FIG. 5a (recharging the secondary network) and as shown in FIG. 5b (discharging the secondary network).

Figure 6:
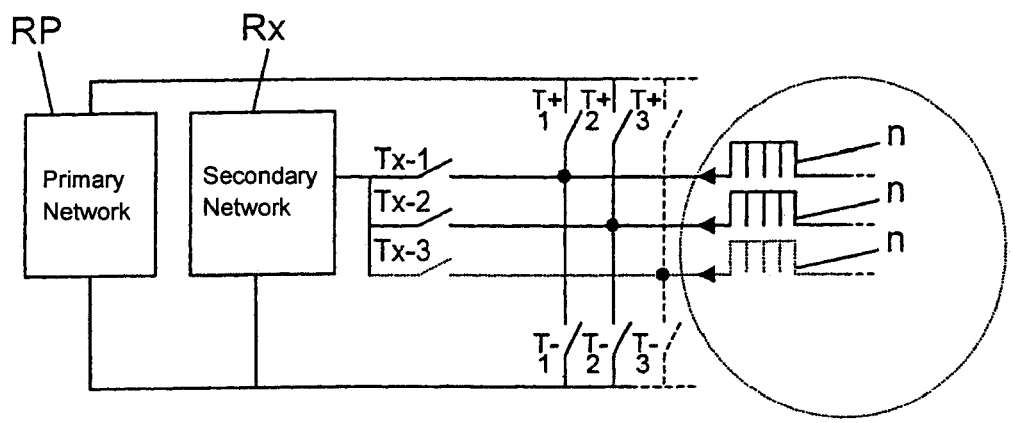
FIG. 6 is a diagrammatic view of a variable-reluctance machine comprising a plurality of inductive coils connected to a secondary electrical power supply network.

FIG. 6 shows a generalization of the invention to a variable-reluctance machine comprising n inductive coils.

Structurally, this machine is identical to that shown in FIGS. 3 or 4, in particular, however each coil 1 to n is associated with a third controlled switch Tx-1, Tx-2, Tx-3, . . . , each of these third switches being connected to a secondary power supply network Rx and being capable of operating in the manners described above.

FIG. 7 shows another implementation of the invention comprising a plurality of secondary networks Rx, Ry, Rz, each capable of operating at different power supply potentials.

In this configuration, the connection point of an inductive coil n is associated with a plurality of third controlled switches in parallel T1, T2, Tx, each of these bypass switches being connected to a respective secondary power supply network Rx, Ry, Rz.

Given that ground, the primary network, and the secondary networks are at different electrical potentials, e.g. respectively 0, 12 V, 42 V, it is necessary for the first, second, and third switches, respectively T+i, T−i, Tx-i that are connected to the same connection point of an inductive coil never to be ON simultaneously (in this example, i lies in the range 1 to n).

It will be understood from the above that the teaching concerning the configurations of variable-reluctance machines shown in FIGS. 6 and 7 can be generalized, by combining the machine of FIG. 7 with the n coils of FIG. 6.

Figure 8:
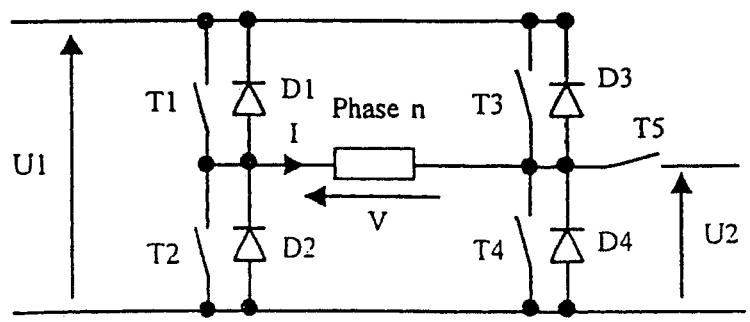
FIG. 8 is a diagrammatic view of an alternator/starter.

With reference to FIG. 8, there follows a description of a particular use of the invention to an alternator/starter using a battery U1=42V and adapted to recharging a battery U2=12V, and also enabling a bidirectional converter U1/U2 to be provided.

The functions of this circuit are thus as follows:
providing a motor function (i.e. a starter) from the 42 V battery;
providing a generator function on the 42 V network;
providing a generator function on the 12 V network;
providing a function of feeding the 12 V network from the 42 V network; and
providing a function of charging the 42 V battery from the 12 V battery.

The first two functions are those "conventionally" required of an alternator/starter, while the last three functions are those required of a two-voltage converter.

In conventional alternator/starter mode (42 V), only the components T1, D2, D3, and T4 are used, with these components preferably being constituted by transistors for the switches and by diodes. In this case, the coils of the machine are powered solely by the main network (U1=42V). The switch T5 is OFF and only T1, D2, D3, and T4 operate when the current leaving the coil is positive, when this current is negative, D1, T2, T3, and D4 operate.

The combination of switches Tx and diodes Dx is preferably implemented using metal oxide silicon (MOS) technology.

In this mode of operation, it is possible to use the switch T2 during conduction of D2 so as to reduce Joule effect losses. The use of a switch in parallel with D3 also makes it possible to do the same thing, but under such circumstances, the transistors T3, T4, and T5 must be turned ON mutually exclusively (only one of them being ON at any one time).

In alternator mode (machine rotating), or in 42V/12V converter mode (machine stopped), only the components T1, D2, and T5 are used.

Another mode of operation can be used. This is a 12V/42V converter or "booster" mode. In this case, use is made of the inductance of the machine. The components used are then D1, T2, and T5.

In terms of operating constraints, it is important to observe that T1 and T2 must not be ON simultaneously since that would short-circuit the 42 V network. T5 and T4 must likewise not conduct simultaneously since that would short-circuit the 12 V network. In "booster" operation, given that the current flowing through the machine is reversed and it is the 12 V network that is supplying power, it is necessary for the switch T5 to be capable of conducting current in both directions.

Obtaining these various modes of operation relies on appropriate control of the switches and proper management of their various electrical states, specifically:

an ON, or conductive, mode in which the first and second switches of a given half-bridge are closed and conduct, with the voltage U1 or U2 being applied to the terminals of the coil n;

an OFF, or open-circuit, mode in which the first and second switches are blocked. The voltage—U1 or U2—is applied when the current at the terminals of the coil n is not zero, or a zero voltage is applied when the current is zero; and a "freewheel" mode in which one of the switches is OFF while the other is ON and vice versa, thereby obtaining freewheel operation with the voltage at the terminals of coil n being zero;

this control needs to be coupled with control of the third switch.

The control signals for all of the components can be generated either in hardware manner by means of a specialized circuit, in particular of the field. programmable gate array (FPGA) type, or else in software manner by means of a microcontroller.

The invention claimed is:

1. A method of controlling a machine including at least one inductive coil, the inductive coil being connected to a primary electricity power supply network via a control circuit comprising, between a connection point of the coil under consideration and terminals of the primary network, at least one half-bridge of a variator adapted to controlling said machine, said half-bridge being formed by first and second controlled switches, the first and second switches each being capable of occupying an ON or an OFF electrical state, the method comprising:

connecting the connection point of the coil to at least one third controlled switch capable of occupying an electrical OFF state or an electrical ON state, the third switch constituting a bypass switch connected to at least one secondary electrical power supply network; and associating the electrical state of the third switch with that of the half-bridge in such a manner that the electrical energy stored in the inductive coil of the machine is retransmitted to the main network and/or to the secondary network.

2. A control method according to claim 1, in which the third switch is turned ON only when the first and second switches are OFF.

3. A control method according to claim 1, in which the third switch connected to a first secondary network is turned ON only when another third switch connected to a second secondary network is OFF.

4. A control method according to claim 3, in which a dead time is introduced between the times the third switches are ON so as to avoid short circuits between the primary network and the secondary electrical power supply networks.

5. A control method according to claim 1 wherein the machine may be controlled based on the connection and the association to operate as a static converter for multiplying or dividing voltage.

6. A control method according to claim 1 wherein the machine may be controlled based on the connection and the association to operate as a combined variator and converter.

7. A control method according to claim 1, wherein the machine may be controlled based on the connection and the association to operate as a two-voltage variable-reluctance alternator/starter.

8. A machine having a circuit comprising:

an inductive coil, the inductive coil being coupled to a first electrical power supply network by a control circuit the control circuit comprising, at least one half-bridge of a variator connected between a connection point of the coil and terminals of the primary network, the half-bridge being formed by first and second controlled switches, the first and second switches each being capable of occupying an ON electrical state and an OFF electrical state; and a third switch coupled to the connection point of the coil and capable of occupying an OFF electrical state and an ON electrical state, the third coil also coupled to a second electrical power supply network.

9. The machine of claim 8, wherein an electrical state of the third switch is associated with an electrical state of the half-bridge such that the electrical energy stored in the inductive coil of the machine may be retransmitted to at least one of the first network and the second network.

10. The machine of claim 9, wherein the third switch is controlled such that the third switch is turned ON only when the first and second switches are OFF.

11. The machine of claim 9, further comprising a fourth switch coupled to a third electrical power supply network, wherein the third switch is turned ON only when the fourth switch is OFF.

12. The machine of claim 11, wherein dead time exists between a time when the third switch is turned ON and a time when the fourth switch is turned ON.

13. The machine of claim 9, wherein the circuit, including the third switch, is configured to serve as a static converter capable of at least one of multiplying voltage and dividing voltage.

14. The machine of claim 9, wherein the circuit, including the third switch, is configured to serve as a combined variator and converter.

15. The machine of claim 9, wherein the circuit further comprises a plurality of diodes connected to the switches.

16. The machine of claim 9, wherein the only electrical power supply network to which the third coil is connect is the second electrical power supply network.

17. The machine of claim 9, further comprising a fourth switch coupled to the second electrical power supply network.

18. A machine comprising:
an inductive coil, the inductive coil being connected to a primary electrical power supply network by a control circuit comprising, between a connection point of the coil and terminals of the primary network,
at least one half-bridge of a variator, the half-bridge being formed by first and second controlled switches,
the first and second switches each being capable of occupying an ON electrical state and an OFF electrical state;
a third switch connected to the connection point of the coil and capable of occupying an OFF electrical state and an ON electrical state, the third coil also connected to at least one secondary electrical power supply network;
wherein an electrical state of the third switch is associated with an electrical stage of the half-bridge such that the electrical energy stored in the inductive coil of the machine may be retransmitted to at least one of the main network and the secondary network.

19. The machine of claim 18, wherein the third switch is controlled such that the third switch is turned ON only when the first and second switches are OFF.

20. The machine of claim 18, further comprising a fourth switch coupled to a third electrical power supply network, wherein the third switch is turned ON only when the fourth switch is OFF.

21. The machine of claim 20, wherein dead time exists between a time when the third switch is turned ON and a time when the fourth switch is turned ON.

22. The machine of claim 18, further comprising a fourth switch coupled to the secondary electrical power supply network.

23. A method for operating a variable reluctance alternator having a circuit including an inductive coil, a primary electrical power network, and a secondary electrical power network, the method comprising:
providing a generator function on the primary network;
providing a motor function from the primary network;
supplying power to one of the primary network and secondary network from the inductive coil;
providing a generator function on the secondary network;
providing a function of feeding the secondary network from the primary network; and providing a function of charging a battery of the primary network from a battery of the secondary network;
wherein the primary network has a voltage of about 42 V and the secondary network has a voltage of about 12 V.

24. The method of claim 23, wherein supplying power to one of the primary network and secondary network from the inductive coil comprises actuating a switch connected to the connection point of the coil.

25. The method of claim 24, wherein the primary network has a voltage of about 42 V and the secondary network has a voltage of about 12 V.

* * * * *